US012738413B2

(12) United States Patent
Koshiji et al.

(10) Patent No.: US 12,738,413 B2
(45) Date of Patent: Sep. 15, 2026

(54) MULTILAYER COIL COMPONENT

(71) Applicant: Murata Manufacturing Co., Ltd., Kyoto-fu (JP)

(72) Inventors: Kenjirou Koshiji, Nagaokakyo (JP); Shun Takai, Nagaokakyo (JP); Rika Yamada, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 534 days.

(21) Appl. No.: 18/493,371

(22) Filed: Oct. 24, 2023

(65) Prior Publication Data

US 2024/0177922 A1 May 30, 2024

(30) Foreign Application Priority Data

Nov. 28, 2022 (JP) ................................ 2022-189200

(51) Int. Cl.
*H01F 27/32* (2006.01)
*H01F 27/29* (2006.01)

(52) U.S. Cl.
CPC ............ *H01F 27/32* (2013.01); *H01F 27/29* (2013.01)

(58) Field of Classification Search
CPC ................................ H01F 27/32; H01F 27/29
See application file for complete search history.

(56) References Cited

U.S. PATENT DOCUMENTS

2019/0304655 A1* 10/2019 Hirukawa ........... H01F 27/2804
2020/0373066 A1* 11/2020 Hirukawa ........... H01F 17/0013
2022/0324757 A1* 10/2022 Sugii ..................... C04B 35/265

FOREIGN PATENT DOCUMENTS

JP 2004-207608 A 7/2004
JP 2014170875 A * 9/2014
JP 2022-161326 A 10/2022

OTHER PUBLICATIONS

Japanese Patent Office—Trial and Appeal Decision (Translated) 2026 (Year: 2026).*

* cited by examiner

*Primary Examiner* — Malcolm Barnes
(74) *Attorney, Agent, or Firm* — Studebaker Brackett PLLC

(57) ABSTRACT

A multilayer coil component includes a multilayer body including insulating layers laminated in a lamination direction and a coil therein and outer electrodes that are at surfaces of the multilayer body and electrically connected to the coil. The multilayer body has first and second end surfaces facing each other in a length direction, first and second main surfaces facing each other in a height direction perpendicular to the length direction, and first and second side surfaces facing each other in a width direction perpendicular to the length and height directions. The outer electrodes include a first outer electrode extending from at least a portion of the first end surface to a portion of the first main surface and a second outer electrode extending from at least a portion of the second end surface to a portion of the first main surface.

8 Claims, 5 Drawing Sheets

MULTILAYER COIL COMPONENT

CROSS-REFERENCE TO RELATED APPLICATION

This application claims benefit of priority to Japanese Patent Application No. 2022-189200, filed Nov. 28, 2022, the entire content of which is incorporated herein by reference.

BACKGROUND

Technical Field

The present disclosure relates to a multilayer coil component.

Background Art

Japanese Unexamined Patent Application Publication No. 2004-207608 discloses a multilayer electronic component manufactured by forming recessed grooves in green sheets, applying a plurality of electrically conductive paste portions to the recessed grooves in a matrix manner, laminating the plurality of green sheets together so as to form a plurality of coils therein, cutting and firing the laminated green sheets, and providing terminal electrodes at the two end portions of each of the obtained element bodies. In a cross-sectional shape of a coil conductor that is made of the electrically conductive paste and that has undergone firing, the coil conductor partially overlaps the two sides of the recessed grooves, and the aspect ratio t/w between a thickness t and a width w of the coil conductor in the cross-section is 0.7 or more.

However, in the multilayer coil component described in Japanese Unexamined Patent Application Publication No. 2004-207608, there is a possibility that the bonding strength of terminal electrodes that correspond to the outer electrodes may be insufficient.

SUMMARY

Accordingly, the present disclosure provides a multilayer coil component capable of improving the bonding strength of outer electrodes.

A multilayer coil component of the present disclosure includes a multilayer body that includes a plurality of insulating layers laminated in a lamination direction and a coil formed inside the multilayer body and an outer electrode that is provided at a surface of the multilayer body and electrically connected to the coil. The multilayer body has a first end surface and a second end surface that face each other in a length direction, a first main surface and a second main surface that face each other in a height direction, which is perpendicular to the length direction, and a first side surface and a second side surface that face each other in a width direction, which is perpendicular to the length direction and the height direction. The outer electrode includes a first outer electrode extending from at least a portion of the first end surface of the multilayer body to a portion of the first main surface and a second outer electrode extending from at least a portion of the second end surface of the multilayer body to a portion of the first main surface. The outer electrode includes a base electrode containing at least Ag and glass. A diffusion length of the glass from an interface between the outer electrode and the multilayer body toward the multilayer body is 2.44 μm or more and 6.90 μm or less (i.e., from 2.44 μm to 6.90 μm).

According to the present disclosure, a multilayer coil component capable of improving the bonding strength of outer electrodes can be provided.

DETAILED DESCRIPTION

A multilayer coil component of the present disclosure will be described below.

However, the present disclosure is not limited to the following configurations and aspects and can be applied with appropriate modifications within a range that does not alter the gist of the present disclosure. Note that combinations of two or more individual preferable configurations and aspects of the present disclosure that will be described below are also included in the present disclosure.

Figure 1:
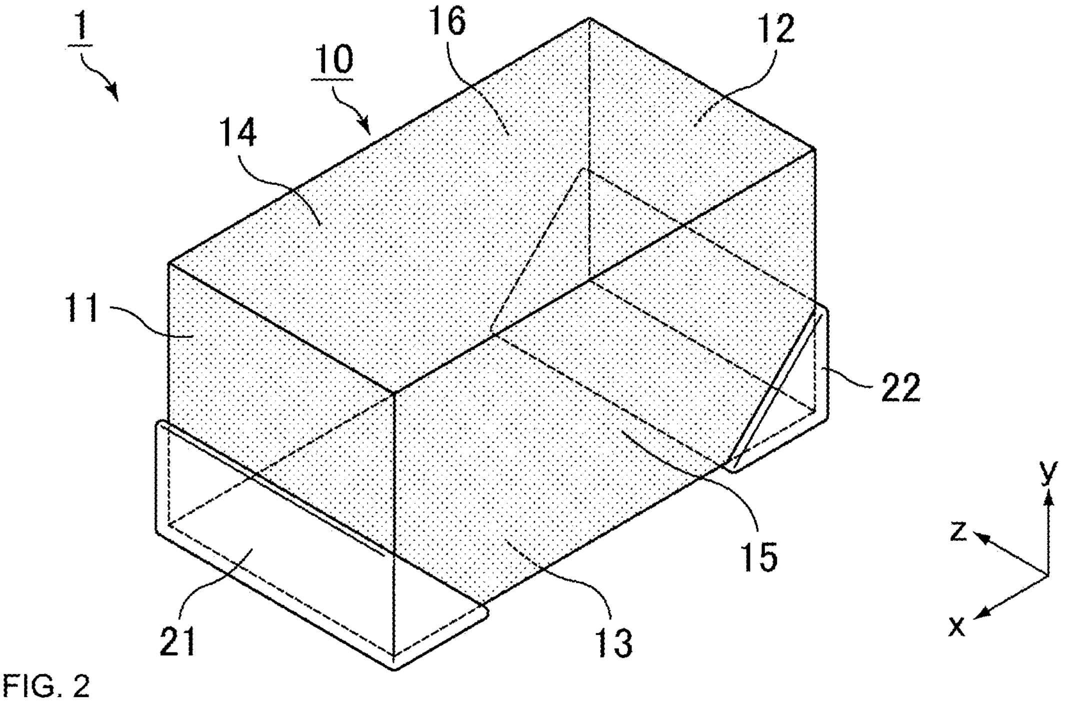
FIG. 1 is a perspective view schematically illustrating an example of a multilayer coil component of the present disclosure.

FIG. 1 is a perspective view schematically illustrating an example of a multilayer coil component of the present disclosure.

A multilayer coil component 1 illustrated in FIG. 1 includes a multilayer body (an element body) 10, a first outer electrode 21, and a second outer electrode 22. The multilayer body 10 has a substantially rectangular parallelepiped shape having six surfaces. Although the configuration of the multilayer body 10 will be described later, the multilayer body 10 includes a plurality of insulating layers laminated in a lamination direction in such a manner as to form a coil inside the multilayer body 10. The first outer electrode 21 and the second outer electrode 22 are each electrically connected to the coil.

In the multilayer coil component and the multilayer body in the present specification, a length direction, a height direction, and a width direction respectively correspond to the x direction, the y direction, and the z direction in FIG. 1. Here, the length direction (the x direction), the height direction (the y direction), and the width direction (the z direction) are perpendicular to one another.

The length direction (the x direction) is a direction parallel to the lamination direction.

As illustrated in FIG. 1, the multilayer body 10 has a first end surface 11 and a second end surface 12 that face each other in the length direction (the x direction), a first main surface 13 and a second main surface 14 that face each other in the height direction (the y direction), which is perpendicular to the length direction, and a first side surface 15 and a second side surface 16 that face each other in the width direction (the z direction), which is perpendicular to the length direction and the height direction.

Although not illustrated in FIG. 1, it is preferable that corner portions and ridge portions of the multilayer body 10 be rounded. A corner portion of a multilayer body is a portion where three surfaces intersect one another, and a ridge portion of a multilayer body is a portion where two surfaces intersect each other.

A first outer electrode and a second outer electrode are each an outer electrode that extends along a main surface of a multilayer body from at least a portion of an end surface of the multilayer body.

In the multilayer coil component 1 illustrated in FIG. 1, the first outer electrode 21 is disposed so as to cover a portion of the first end surface 11 of the multilayer body 10 and so as to extend from the first end surface 11 and cover a portion of the first main surface 13.

The first outer electrode 21 covers a region of the first end surface 11, the region including the ridge portion that intersects the first main surface 13.

Note that, in FIG. 1, although a portion of the first outer electrode 21 that covers the first end surface 11 of the multilayer body 10 has a uniform height, the shape of the first outer electrode 21 is not particularly limited as long as the first outer electrode 21 covers a portion of the first end surface 11 of the multilayer body 10. For example, the first outer electrode 21 at the first end surface 11 of the multilayer body 10 may have an arch-like shape that increases in height from the end portions toward a center portion thereof. In addition, although a portion of the first outer electrode 21 that covers the first main surface 13 of the multilayer body 10 has a uniform length, the shape of the first outer electrode 21 is not particularly limited as long as the first outer electrode 21 covers a portion of the first main surface 13 of the multilayer body 10. For example, the first outer electrode 21 at the first main surface 13 of the multilayer body 10 may have an arch-like shape that increases in length from the end portions toward the center portion thereof.

As illustrated in FIG. 1, the first outer electrode 21 may be disposed so as to further extend from the first end surface 11 and the first main surface 13 and cover a portion of the first side surface 15 and a portion of the second side surface 16. In this case, it is preferable that a portion of the first outer electrode 21 that covers the first side surface 15 and a portion of the first outer electrode 21 that covers the second side surface 16 be formed so as to be inclined with respect to the ridge portion that intersects the first end surface 11 and the ridge portion that intersects the first main surface 13. Note that the first outer electrode 21 does not need to be disposed so as to cover a portion of the first side surface 15 and a portion of the second side surface 16.

In the multilayer coil component 1 illustrated in FIG. 1, the second outer electrode 22 is disposed so as to cover a portion of the second end surface 12 of the multilayer body 10 and so as to extend from the second end surface 12 and cover a portion of the first main surface 13.

Similar to the first outer electrode 21, the second outer electrode 22 covers a region of the second end surface 12, the region including the ridge portion that intersects the first main surface 13.

Similar to the first outer electrode 21, the shape of the second outer electrode 22 is not particularly limited as long as the second outer electrode 22 covers a portion of the second end surface 12 of the multilayer body 10. For example, the second outer electrode 22 at the second end surface 12 of the multilayer body 10 may have an arch-like shape that increases in height from the end portions toward a center portion thereof. In addition, the shape of the second outer electrode 22 is not particularly limited as long as the second outer electrode 22 covers a portion of the first main surface 13 of the multilayer body 10. For example, the second outer electrode 22 at the first main surface 13 of the multilayer body 10 may have an arch-like shape that increases in length from the end portions toward the center portion thereof.

Similar to the first outer electrode 21, the second outer electrode 22 may be disposed so as to further extend from the second end surface 12 and the first main surface 13 and cover a portion of the first side surface 15 and a portion of the second side surface 16. In this case, it is preferable that a portion of the second outer electrode 22 that covers the first side surface 15 and a portion of the second outer electrode 22 that covers a portion of the second side surface 16 be formed so as to be inclined with respect to the ridge portion that intersects the second end surface 12 and the ridge portion that intersects the first main surface 13. Note that the second outer electrode 22 does not need to be disposed so as to cover a portion of the first side surface 15 and a portion of the second side surface 16.

Since the first outer electrode 21 and the second outer electrode 22 are arranged in the manner described above, when the multilayer coil component 1 is mounted onto a substrate, the first main surface 13 of the multilayer body 10 serves as a mounting surface.

In addition, unlike the structure illustrated in FIG. 1, the first outer electrode may cover the entire first end surface of the multilayer body and may extend from the first end surface so as to cover a portion of the first main surface, a portion of the second main surface, a portion of the first side surface, and a portion of the second side surface.

Furthermore, the second outer electrode may cover the entire second end surface of the multilayer body and may extend from the second end surface so as to cover a portion of the first main surface, a portion of the second main surface, a portion of the first side surface, and a portion of the second side surface.

In this case, one of the first main surface, the second main surface, the first side surface, and the second side surface of the multilayer body serves as the mounting surface.

Although the size of the multilayer coil component of the present disclosure is not particularly limited, it is preferable that the size of the multilayer coil component be 0603 size, 0402 size, or 1005 size.

The first outer electrode and the second outer electrode each include a base electrode containing at least silver (Ag) and glass.

It is preferable that the proportion of the volume of Ag powder relative to the sum of the volume of Ag and the volume of glass be 2% by volume or more and 90% by volume or less (i.e., from 2% by volume to 90% by volume).

The first outer electrode and the second outer electrode may each have a multilayer structure and may each include, for example, the above-mentioned base electrode (a base electrode layer), a nickel coating, and a tin coating arranged in this order starting from the side on which a surface of the multilayer body is present.

The diffusion length of the glass contained in the base electrode of the first outer electrode from the interface between the first outer electrode and the multilayer body toward the multilayer body is 2.44 μm or more and 6.90 μm or less (i.e., from 2.44 μm to 6.90 μm).

Thus, the bonding strength between the first outer electrode and the multilayer body can be increased. For example, in a fixing strength measurement test, a fixing strength of 3 N or more at which the failure probability is 1% can be obtained.

Similarly, the diffusion length of the glass contained in the base electrode of the second outer electrode from the interface between the second outer electrode and the multilayer body toward the multilayer body is 2.44 μm or more and 6.90 μm or less (i.e., from 2.44 μm to 6.90 μm).

Thus, the bonding strength between the second outer electrode and the multilayer body can be increased. For example, in a fixing strength measurement test, a fixing strength of 3 N or more at which the failure probability is 1% can be obtained.

This is presumably because, when the glass is diffused toward the multilayer body, the interface between the first outer electrode and the multilayer body and the interface between the second outer electrode and the multilayer body become stronger (the interfaces become blurred). In other words, it is presumably because the glass diffused toward the multilayer body serves as a certain type of adhesive.

In contrast, it is assumed that the first and second outer electrodes are likely to be separated from their respective base electrodes if the glass is not diffused to the multilayer body.

In addition, the interface strength required between the first outer electrode and the multilayer body and the bonding strength between the second outer electrode and the multilayer body can be ensured also by reducing the sizes of the first and second outer electrodes. Thus, the stray capacitance can be reduced by reducing the sizes of the first and second outer electrodes, and a favorable transmission coefficient S21 in a high-frequency region can be obtained.

If the diffusion length of the glass is less than 2.44 μm, there may be a case where a failure occurs between the multilayer body and the base electrode and where the bonding strength of the first outer electrode and/or the bonding strength of the second outer electrode cannot be improved.

If the diffusion length of the glass is greater than 6.90 μm, there may be a case where a failure occurs in the multilayer body in the vicinity of the first or second outer electrode and where the bonding strength of the first or second outer electrode cannot be improved.

The diffusion length of the glass is preferably 2.44 μm or more and 6.90 μm or less (i.e., from 2.44 μm to 6.90 μm), more preferably 2.52 μm or more and 6.72 μm or less (i.e., from 2.52 μm to 6.72 μm), and further preferably 2.6 μm or more and 5.2 μm or less (i.e., from 2.6 μm to 5.2 μm).

When the diffusion length of the glass is 2.44 μm or more and 6.90 μm or less (i.e., from 2.44 μm to 6.90 μm), the fixing strength at which the failure probability is 1% can be 3 N or more.

When the diffusion length of the glass is 2.6 μm or more and 5.2 μm or less (i.e., from 2.6 μm to 5.2 μm), the fixing strength at which the failure probability is 1% can be 4 N or more.

The diffusion length of the glass can be determined by performing, for example, an elementary analysis using the wavelength dispersive X-ray spectrometry (WDX) on a cross section of the multilayer coil component.

A specific measurement method will be described in the Examples section.

The diffusion length of the glass can be adjusted by changing the baking temperature at the time of forming the base electrodes, and in general, the higher the baking temperature, the larger the diffusion length of the glass. Note that the diffusion length of the glass is not determined only by the baking temperature and varies depending on the composition of the glass and the composition of the insulating layers, the combination of these, and baking conditions such as the baking time. Thus, the diffusion length in the present disclosure is not always obtained even at the same baking temperature.

Note that, here, the phrase "the glass is diffused to the multilayer body" refers to the case where the glass is diffused into the insulating layers of the multilayer body, and in general, only a small amount of glass is diffused toward the coil (the coil conductors) of the multilayer body.

It is preferable that the glass contained in the base electrodes of the first and second outer electrodes contain at least Bi, and it is preferable that the diffusion length of the glass be the diffusion length of Bi.

In this case, for example, the diffusion length of the glass can be easily measured by the wavelength dispersive X-ray spectrometry (WDX) using Bi as a marker (an analysis target).

Note that it is more preferable that the marker that can be used for calculating the diffusion length of the glass be not contained in the insulating layers and be based on elements contained in the glass of the base electrodes and that measurement be performed by selecting one type of element among the elements having a high concentration, excluding Si and O. More specifically, Bi is most preferable, and K is preferable when measurement cannot be performed by using Bi.

A marker component such as Bi does not usually exist alone and coexists with the other components of the glass in such a manner as to form an amorphous phase in the base electrodes and the insulating layers of the multilayer body.

It is preferable that the glass contained in the base electrodes of the first and second outer electrodes contain 3% by weight or more and 90% by weight or less (i.e., from 3% by weight to 90% by weight) of Si in terms of $SiO_2$, 0.001% by weight or more and 20% by weight or less (i.e., from 0.001% by weight to 20% by weight) of B in terms of $B_2O_3$, 0.001% by weight or more and 20% by weight or less (i.e., from 0.001% by weight to 20% by weight) of Bi in terms of $Bi_2O_3$, and 0.001% by weight or more and 20% by weight or less (i.e., from 0.001% by weight to 20% by weight) of K in terms of $K_2O$.

It is preferable that the insulating layers have a magnetic phase containing at least Fe, Ni, Zn, and Cu, and a non-magnetic phase containing at least Si. The insulating layers are, for example, a sintered compact of a ferrite, glass, or the like, and may include a resin.

By forming the insulating layers out of a composite material of a magnetic material and a non-magnetic material in the manner described above, the glass contained in the base electrodes of the first and second outer electrodes is likely to be diffused toward the multilayer body.

The magnetic phase is a phase containing a magnetic material, and it is preferable that the magnetic phase contain at least Fe, Ni, Zn, and Cu. The magnetic phase may be a phase composed of only a magnetic material.

The magnetic phase may further contain Co, Bi, Sn, Mn, and so forth.

It is preferable that the magnetic material be a Ni—Cu—Zn-based ferrite material, and it is preferable that the magnetic phase be composed of the Ni—Cu—Zn-based ferrite material. As a result of the magnetic phase being composed of the Ni—Cu—Zn-based ferrite material, the inductance of the multilayer coil component is increased.

The Ni—Cu—Zn-based ferrite material may further contain additives such as Co, Bi, Sn, and Mn and incidental impurities.

In addition, the magnetic phase is a phase containing Fe, Ni, Zn, and Cu when an elementary analysis is performed thereon. Furthermore, the magnetic phase may be a phase that further contains Co, Bi, Sn, Mn, and so forth when an elementary analysis is performed thereon.

It is preferable that the magnetic phase contain 40 mol % or more and 49.5 mol % or less (i.e., from 40 mol % to 49.5 mol %) of Fe in terms of $Fe_2O_3$, 2 mol % or more and 35 mol % or less (i.e., from 2 mol % to 35 mol %) of Zn in terms of ZnO, 6 mol % or more and 13 mol % or less (i.e., from 6 mol % to 13 mol %) of Cu in terms of CuO, and 10 mol % or more and 45 mol % or less (i.e., from 10 mol % to 45 mol %) of Ni in terms of NiO.

The non-magnetic phase is a phase containing a non-magnetic material and contains at least Si. The non-magnetic phase may be a phase composed of only a non-magnetic material.

Examples of the non-magnetic material of the non-magnetic phase include a glass material, forsterite ($2MgO \cdot SiO_2$), and willemite [$aZnO \cdot SiO_2$ (where a is 1.8 or more and 2.2 or less (i.e., from 1.8 to 2.2))].

Note that, in the present specification, the phrase “non-magnetic phase containing at least Si” may be formed of only a phase that contains Si or may be formed of a phase that contains Si and a phase that does not contain Si. An example of the phase that does not contain Si may be a crystal phase that does not contain Si.

It is preferable that the non-magnetic phase contain a glass material. When the non-magnetic phase contains a glass material, the glass contained in the base electrodes of the first and second outer electrodes is likely to be diffused toward the multilayer body.

It is preferable that the glass material contained in the non-magnetic phase do not contain a marker (e.g., Bi or K) that is used for calculating the diffusion length of the glass.

More specifically, it is preferable that borosilicate glass be used as the glass material.

It is preferable that the borosilicate glass contain 70% by weight or more and 85% by weight or less (i.e., from 70% by weight to 85% by weight) of Si in terms of $SiO_2$, 10% by weight or more and 25% by weight or less (i.e., from 10% by weight to 25% by weight) of B in terms of $B_2O_3$, 0.5% by weight or more and 5% by weight or less (i.e., from 0.5% by weight to 5% by weight) of an alkali metal A in terms of $A_2O$, and 0% by weight or more and 5% by weight or less (i.e., from 0% by weight to 5% by weight) of Al in terms of $Al_2O_3$. Examples of the alkali metal A include K and Na.

Note that, in the case where K is used as a marker, Na is suitable for the alkali metal A.

The non-magnetic phase may further contain forsterite ($2MgO \cdot SiO_2$), a quartz ($SiO_2$), or the like as a filler.

The magnetic phase and the non-magnetic phase can be distinguished from each other as follows. First, a cross section of the multilayer body of the multilayer coil component along the lamination direction is exposed by grinding the multilayer body, and after that, elemental mapping is performed on the multilayer body by performing scanning transmission electron microscopy-energy dispersive X-ray analysis (STEM-EDX). Then, the magnetic phase and the non-magnetic phase are distinguished from each other by regarding a region in which an Fe element, a Ni element, a Zn element, and a Cu element are present as the magnetic phase and by regarding regions other than the magnetic phase as the non-magnetic phase.

Note that the cross section along the lamination direction is a cross section such as that illustrated in FIG. 2, which will be described later.

It is preferable that the proportion of the volume of forsterite relative to the total volume of the non-magnetic phase be 1.5% by volume or more and 20% by volume or less (i.e., from 1.5% by volume to 20% by volume).

The proportion of the volume of forsterite contained in the non-magnetic phase can be determined by distinguishing a region in which a Mg element, which is an element contained in forsterite, is present as a region in which forsterite is present and measuring the proportion of the area of the region in which forsterite is present relative to the area of the non-magnetic phase.

When 1.5% by volume or more and 20% by volume or less (i.e., from 1.5% by volume to 20% by volume) of the non-magnetic phase consists of forsterite, the strength of the multilayer body is improved.

Next, an example of the coil that is built in the multilayer body, which is included in the multilayer coil component, will be described.

The coil is formed as a result of the plurality of coil conductors that are laminated in the lamination direction together with the insulating layers being electrically connected to one another.

Figure 2:
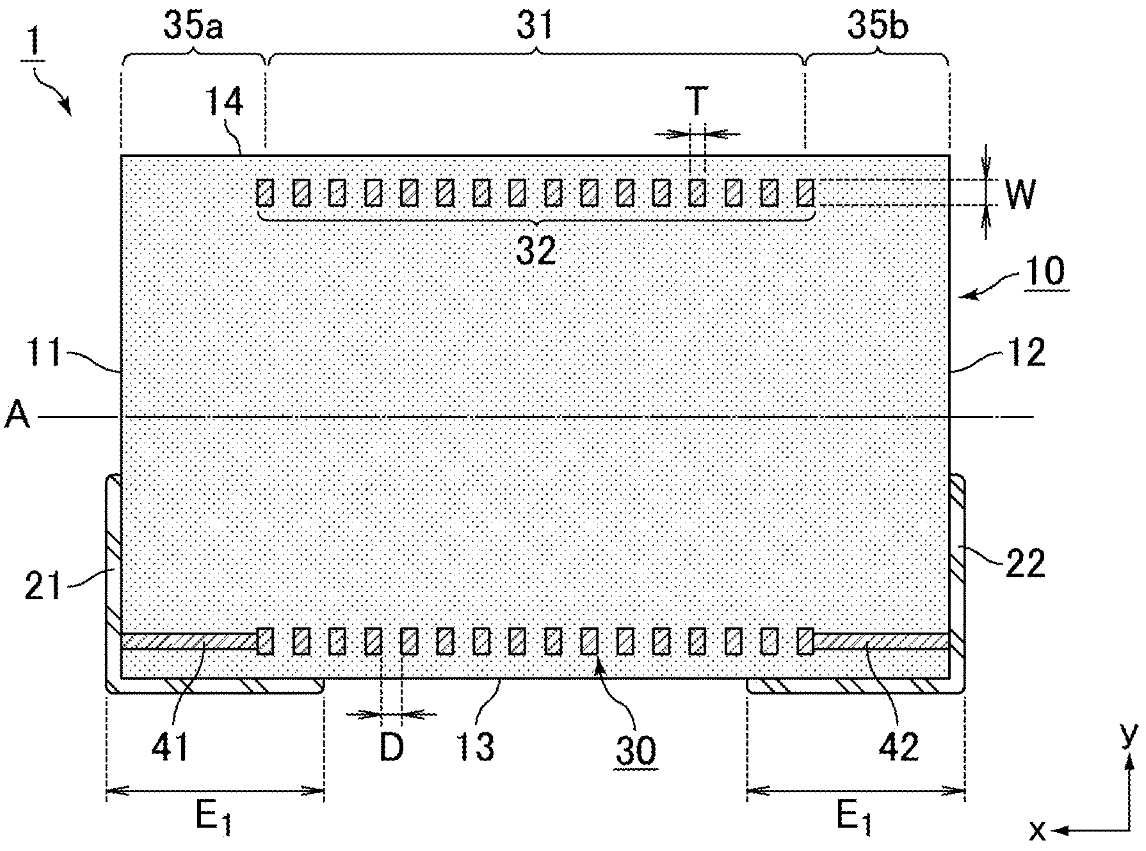
FIG. 2 is a sectional view schematically illustrating the example of the multilayer coil component of the present disclosure.
Figure 3:
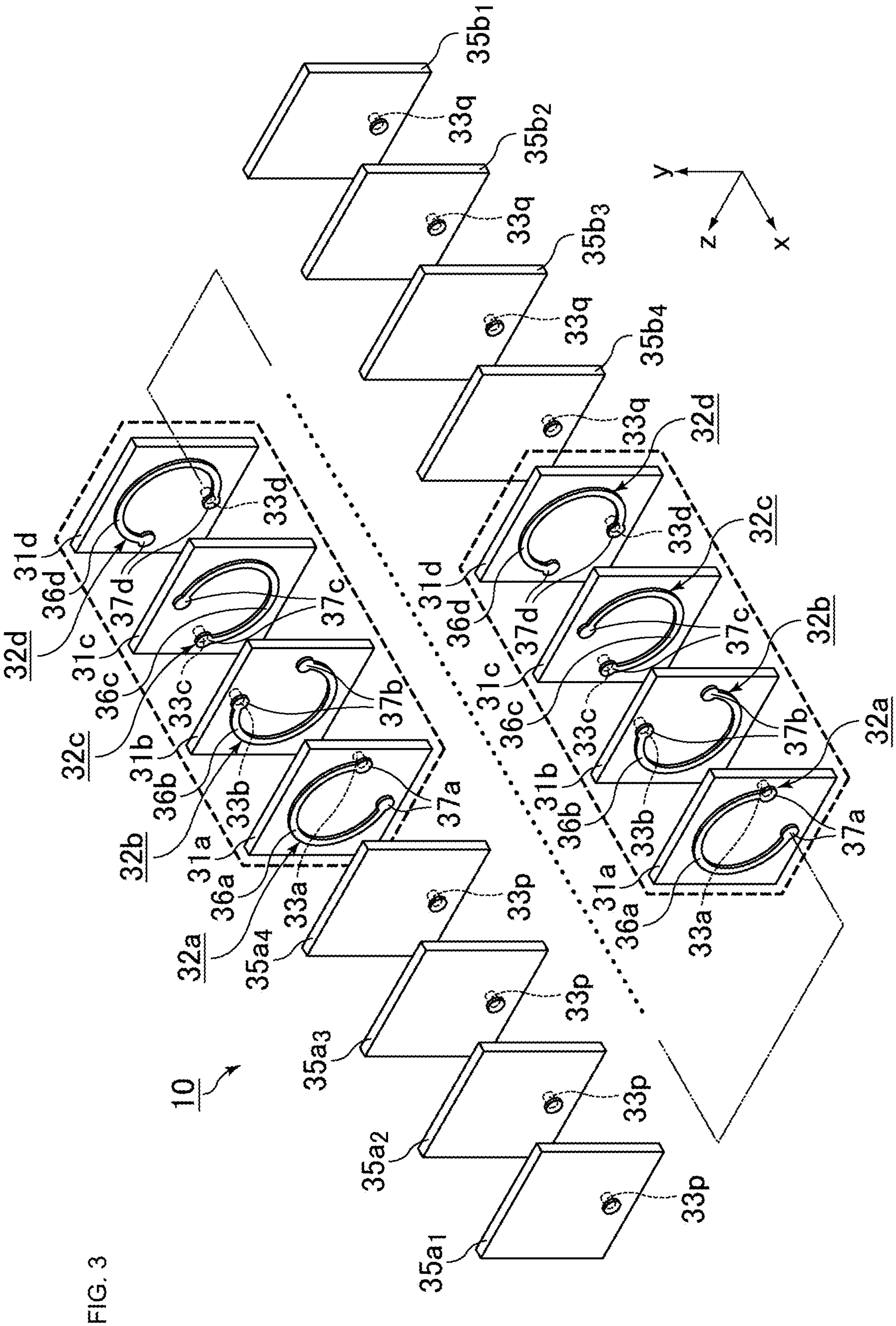
FIG. 3 is a schematic exploded perspective view schematically illustrating insulating layers that are included in the multilayer coil component illustrated in FIG. 2.
Figure 4:
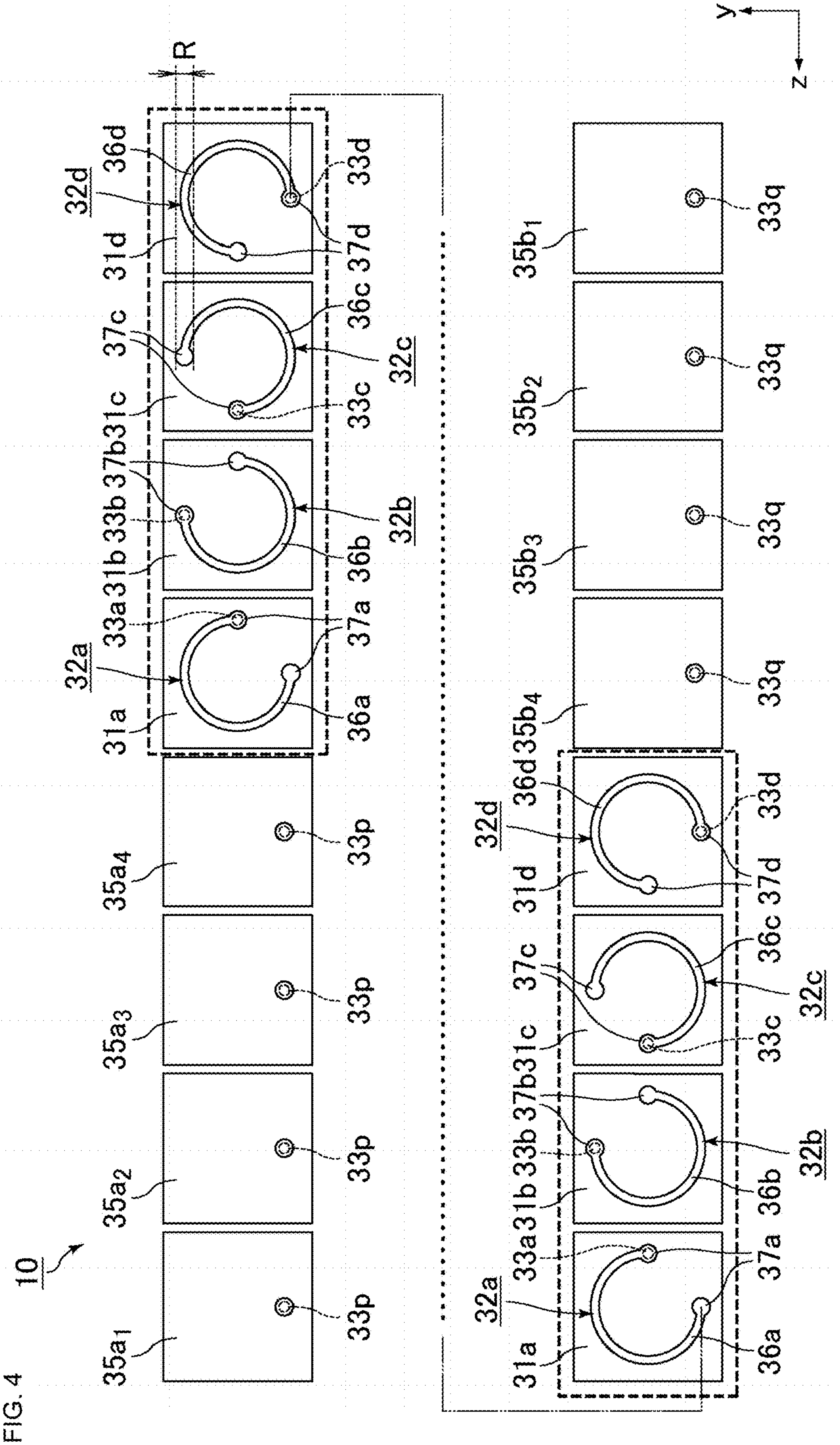
FIG. 4 is a schematic exploded plan view schematically illustrating the insulating layers included in the multilayer coil component illustrated in FIG. 2.

FIG. 2 is a sectional view schematically illustrating the example of the multilayer coil component of the present disclosure. FIG. 3 is a schematic exploded perspective view schematically illustrating insulating layers that are included in the multilayer coil component illustrated in FIG. 2. FIG. 4 is a schematic exploded plan view schematically illustrating the insulating layers included in the multilayer coil component illustrated in FIG. 2.

FIG. 2 schematically illustrates the insulating layers, the coil conductors, connection conductors, and the lamination direction in the multilayer body. FIG. 2 does not provide strict accuracy in depicting the actual shapes, the actual connections, and so forth. For example, the coil conductors are connected to one another by via conductors.

As illustrated in FIG. 2, the multilayer coil component 1 includes the multilayer body 10 that includes a coil 30 built therein, the coil 30 being formed as a result of a plurality of coil conductors 32 that are laminated together with the insulating layers being electrically connected to one another, and the first and second outer electrodes 21 and 22 each of which is electrically connected to the coil 30.

The multilayer body 10 has a region in which the coil conductors 32 are arranged and a region in which a first connection conductor 41 or a second connection conductor 42 is disposed. The lamination direction in the multilayer body 10 and the axial direction of the coil 30 (the direction in which a coil axis A extends in FIG. 2) are each parallel to the first main surface 13.

As illustrated in FIG. 3 and FIG. 4, the multilayer body 10 includes insulating layers 31 that are illustrated in FIG. 2 and that are an insulating layer 31*a*, an insulating layer 31*b*, an insulating layer 31*c*, and an insulating layer 31*d*. The multilayer body 10 includes insulating layers 35*a* that are illustrated in FIG. 2 and that are an insulating layer $\mathbf{35}a_1$, an insulating layer $\mathbf{35}a_2$, an insulating layer $\mathbf{35}a_3$, and an insulating layer $\mathbf{35}a_4$. The multilayer body 10 includes insulating layers 35*b* that are illustrated in FIG. 2 and that are an insulating layer $\mathbf{35}b_1$, an insulating layer $\mathbf{35}b_2$, an insulating layer $\mathbf{35}b_3$, and an insulating layer $\mathbf{35}b_4$.

The coil 30 includes a coil conductor 32*a*, a coil conductor 32*b*, a coil conductor 32*c*, and a coil conductor 32*d* as the coil conductors 32 illustrated in FIG. 2.

The coil conductor 32*a*, the coil conductor 32*b*, the coil conductor 32*c*, and the coil conductor 32*d* are arranged on a main surface of the insulating layer 31*a*, a main surface of the insulating layer 31*b*, a main surface of the insulating layer 31*c*, and a main surface of the insulating layer 31*d*, respectively.

The coil conductor 32*a*, the coil conductor 32*b*, the coil conductor 32*c*, and the coil conductor 32*d* each have a length equal to the length of a ¾ turn of the coil 30. In other words, the number of the coil conductors 32 laminated so as to form three turns of the coil 30 is four. In the multilayer body 10, the coil conductor 32*a*, the coil conductor 32*b*, the coil conductor 32*c*, and the coil conductor 32*d* are repeatedly laminated as a single unit (equivalent to three turns).

The coil conductor 32*a* includes a line portion 36*a* and land portions 37*a* that are positioned at the end portions of the line portion 36*a*. The coil conductor 32*b* includes a line portion 36*b* and land portions 37*b* that are positioned at the end portions of the line portion 36*b*. The coil conductor 32*c* includes a line portion 36*c* and land portions 37*c* that are positioned at the end portions of the line portion 36*c*. The coil conductor 32*d* includes a line portion 36*d* and land portions 37*d* that are positioned at the end portions of the line portion 36*d*.

A via conductor 33*a*, a via conductor 33*b*, a via conductor 33*c*, and a via conductor 33*d* are arranged in such a manner as to extend through the insulating layer 31*a*, the insulating layer 31*b*, the insulating layer 31*c*, and the insulating layer 31*d*, respectively, in the lamination direction.

The insulating layer 31*a* provided with the coil conductor 32*a* and the via conductor 33*a*, the insulating layer 31*b* provided with the coil conductor 32*b* and the via conductor 33*b*, the insulating layer 31*c* provided with the coil conductor 32*c* and the via conductor 33*c*, and the insulating layer 31*d* provided with the coil conductor 32*d* and the via conductor 33*d* are repeatedly laminated as a single unit (each portion surrounded by a dotted line in FIG. 3 and FIG. 4). As a result, the land portions 37*a* of the coil conductor 32*a*, the land portions 37*b* of the coil conductor 32*b*, the land portions 37*c* of the coil conductor 32*c*, and the land portions 37*d* of the coil conductor 32*d* are connected to one another by the via conductor 33*a*, the via conductor 33*b*, the via conductor 33*c*, and the via conductor 33*d*. In other words, the land portions of adjacent ones of the coil conductors in the lamination direction are connected to each other by a corresponding one of the via conductors.

The coil 30 that has a solenoid shape and that is built in the multilayer body 10 is configured in the manner described above.

When viewed in plan view in the lamination direction, the coil 30 formed of the coil conductor 32*a*, the coil conductor 32*b*, the coil conductor 32*c*, and the coil conductor 32*d* may have a circular shape or may have a polygonal shape. In the case where the coil 30 has a polygonal shape when viewed in plan view in the lamination direction, the coil diameter of the coil 30 is the diameter of a circle that is equivalent to the area of the polygonal shape, and the coil axis of the coil 30 is an axis that extends in the lamination direction through the center of the polygonal shape.

Via conductors 33*p* are arranged such that each of them extends through a corresponding one of the insulating layer 35$a_1$, the insulating layer 35$a_2$, the insulating layer 35$a_3$, and the insulating layer 35$a_4$ in the lamination direction. Land portions that are connected to the via conductors 33*p* may be arranged on main surfaces of the insulating layers 35$a_1$, 35$a_2$, 35$a_3$, and 35$a_4$.

The insulating layer 35$a_1$ provided with one of the via conductors 33*p*, the insulating layer 35$a_2$ provided with one of the via conductors 33*p*, the insulating layer 35$a_3$ provided with one of the via conductors 33*p*, and the insulating layer 35$a_4$ provided with one of the via conductors 33*p* are laminated together so as to overlap the insulating layer 31*a* provided with the coil conductor 32*a* and the via conductor 33*a*. Consequently, the via conductors 33*p* are connected to one another and form the first connection conductor 41, and the first connection conductor 41 is exposed at the first end surface 11. As a result, the first outer electrode 21 and the coil 30 (the coil conductor 32*a*) are connected to each other by the first connection conductor 41.

It is preferable that the first connection conductor 41 extend linearly and connect the first outer electrode 21 and the coil 30 to each other. The phrase "the first connection conductor 41 extends linearly and connects the first outer electrode 21 and the coil 30 to each other" refers to the case where the via conductors 33*p* forming the first connection conductor 41 overlap one another when viewed in plan view in the lamination direction, and the via conductors 33*p* do not need to be aligned exactly in a straight line.

Via conductors 33*q* are arranged such that each of them extends through a corresponding one of the insulating layer 35$b_1$, the insulating layer 35$b_2$, the insulating layer 35$b_3$, and the insulating layer 35$b_4$ in the lamination direction. Land portions that are connected to the via conductors 33*q* may be arranged on main surfaces of the insulating layers 35$b_1$, 35$b_2$, 35$b_3$, and 35$b_4$.

The insulating layer 35$b_1$ provided with one of the via conductors 33*q*, the insulating layer 35$b_2$ provided with one of the via conductors 33*q*, the insulating layer 35$b_3$ provided with one of the via conductors 33*q*, and the insulating layer 35$b_4$ provided with one of the via conductors 33*q* are laminated together so as to overlap the insulating layer 31*d* provided with the coil conductor 32*d* and the via conductor 33*d*. Consequently, the via conductors 33*q* are connected to one another and form the second connection conductor 42, and the second connection conductor 42 is exposed at the second end surface 12. As a result, the second outer electrode 22 and the coil 30 (the coil conductor 32*d*) are connected to each other by the second connection conductor 42.

It is preferable that the second connection conductor 42 extend linearly and connect the second outer electrode 22 and the coil 30 to each other. The phrase "the second connection conductor 42 extends linearly and connects the second outer electrode 22 and the coil 30 to each other" refers to the case where the via conductors 33*q* forming the second connection conductor 42 overlap one another when viewed in plan view in the lamination direction, and the via conductors 33*q* do not need to be aligned exactly in a straight line.

Note that, in the case where the land portions are connected to the via conductors 33*p* forming the first connection conductor 41 and the via conductors 33*q* forming the second connection conductor 42, the shape of the first connection conductor 41 and the shape of the second connection conductor 42 each refer to a shape excluding the land portions.

Although FIG. 3 and FIG. 4 illustrate the case where the number of the coil conductors 32 laminated so as to form three turns of the coil 30 is four, that is, the case where the repeated shape is the shape of a ¾ turn, the number of the coil conductors 32 laminated so as to form a single turn of the coil is not particularly limited.

For example, the number of the coil conductors laminated so as to form a single turn of the coil may be two, that is, the repeated shape may be the shape of a ½ turn.

It is preferable that the coil conductors forming the coil overlap one another when viewed in plan view in the lamination direction. In addition, it is preferable that the shape of the coil be a circular shape when viewed in plan view in the lamination direction. Note that, in the case where the coil includes the land portions, the shape of the coil refers to a shape excluding the land portions (i.e., the shape of the line portions).

In addition, in the case where the land portions are connected to the via conductors that form the connection conductors, the shape of the connection conductors refers to a shape excluding the land portions (i.e., the shape of the via conductors).

Note that the coil conductors illustrated in FIG. 3 are shaped such that the repeated pattern has a circular shape. However, the coil conductors may be shaped such that the repeated pattern has a polygonal shape such as a quadrangular shape.

In addition, the repeated shape of the coil conductors does not need to be the shape of a ¾ turn and may be the shape of a ½ turn.

In the multilayer coil component having a configuration such as that illustrated in FIG. 2, FIG. 3, and FIG. 4, when the size of the multilayer coil component is 0603 size, it is preferable that the multilayer coil component be designed as follows in order to improve the radio-frequency characteristics.

It is preferable that the number of turns of the coil be 33 turns or more and 42 turns or less (i.e., from 33 turns to 42 turns). When the number of turns of the coil is within such a range, the total electrostatic capacitance between the coil conductors can be reduced, and thus, the transmission coefficient S21 can be set to be within a favorable range.

In addition, it is preferable that the coil length be 0.49 mm or more and 0.55 mm or less (i.e., from 0.49 mm to 0.55 mm).

It is preferable that the width of each of the coil conductors be 45 μm or more and 75 μm or less (i.e., from 45 μm to 75 μm). The width of each of the coil conductors is a dimension that is indicated by double-headed arrow W in FIG. 2.

It is preferable that the thickness of each of the coil conductors be 3.5 μm or more and 6.0 μm or less (i.e., from 3.5 μm to 6.0 μm). The thickness of each of the coil conductors is a dimension that is indicated by double-headed arrow T in FIG. 2.

It is preferable that the distance between the coil conductors be 3.0 μm or more and 5.0 μm or less (i.e., from 3.0 μm to 5.0 μm). The distance between the coil conductors is a dimension that is indicated by double-headed arrow D in FIG. 2.

It is preferable that the diameter of each of the land portions of the coil conductors be 30 μm or more and 50 μm or less (i.e., from 30 μm to 50 μm). The diameter of each of the land portions of the coil conductors is a dimension that is indicated by double-headed arrow R in FIG. 4.

When the first main surface of the multilayer body serves as the mounting surface, it is preferable that the length of a portion of the first outer electrode, the portion covering the first main surface of the multilayer body, and the length of a portion of the second outer electrode, the portion covering the first main surface of the multilayer body, each be 0.20 mm or less. In addition, it is preferable that these lengths each be 0.10 mm or more.

The length of the portion of the first outer electrode covering the first main surface of the multilayer body and the length of the portion of the second outer electrode covering the first main surface of the multilayer body are each a dimension that is indicated by double-headed arrow $E_1$ in FIG. 2.

The multilayer coil component of the present disclosure is manufactured by, for example, the following method.

Magnetic Material Production Step $Fe_2O_3$, ZnO, CuO, and NiO are weighed in predetermined proportions. Each of the oxides may contain incidental impurities. Next, a slurry is produced by wet-blending these weighed materials together and then grinding the materials. In this case, an additive such as $Mn_3O_4$, $Bi_2O_3$, $Co_3O_4$, $SiO_2$, or $SnO_2$ may be added. Subsequently, the obtained slurry is dried and then preliminarily fired. The temperature at which the preliminary firing is performed is, for example, 700° C. or higher and 800° C. or lower (i.e., from 700° C. to 800° C.). The length of time over which the preliminary firing is performed is, for example, 2 hours or longer and 5 hours or shorter. In the manner described above, a powdery ferrite material is produced as the magnetic material.

It is preferable that the ferrite material contain 40 mol % or more and 49.5 mol % or less (i.e., from 40 mol % to 49.5 mol %) of $Fe_2O_3$, 2 mol % or more and 35 mol % or less (i.e., from 2 mol % to 35 mol %) of ZnO, 6 mol % or more and 13 mol % or less (i.e., from 6 mol % to 13 mol %) of CuO, and 10 mol % or more and 45 mol % or less (i.e., from 10 mol % to 45 mol %) of NiO.

Non-Magnetic Material Production Step

A non-magnetic material powder is weighed. A glass powder containing an alkali metal such as potassium, boron, silicon, and aluminum in predetermined proportions is prepared as borosilicate glass. In addition, forsterite powder is prepared as a filler. Quartz powder may be further prepared as another filler.

It is preferable that the borosilicate glass contain 70% by weight or more and 85% by weight or less (i.e., from 70% by weight to 85% by weight) of Si in terms of $SiO_2$, 10% by weight or more and 25% by weight or less (i.e., from 10% by weight to 25% by weight) of B in terms of $B_2O_3$, 0.5% by weight or more and 5% by weight or less (i.e., from 0.5% by weight to 5% by weight) of an alkali metal A in terms of $A_2O$, and 0% by weight or more and 5% by weight or less (i.e., from 0% by weight to 5% by weight) of Al in terms of $Al_2O_3$.

It is preferable that the non-magnetic material contain 1.5% by volume or more and 20% by volume or less (i.e., from 1.5% by volume to 20% by volume) of forsterite powder serving as the filler.

Electrically Conductive Paste Production Step

Ag powder is prepared and kneaded with predetermined amounts of a solvent (such as eugenol), a resin (such as ethyl cellulose), and a dispersant by using a planetary mixer or the like, and then, the resulting mixture is dispersed by using a triple-roll mill, so that an electrically conductive paste for the internal conductors is produced.

Green Sheet Production Step

The magnetic material and the non-magnetic material are weighed in predetermined proportions. Next, these weighed materials, an organic binder such as a polyvinyl butyral-based resin, an organic solvent such as ethanol or toluene, a plasticizer, and so forth are mixed together and then ground, so that a slurry is produced. Then, the obtained slurry is formed into a sheet shape having a predetermined thickness by a doctor blade method or the like, and then, the sheet-shaped slurry is punched into a predetermined shape, which is, for example, a rectangular shape, so that a green sheet is produced.

It is preferable that the thickness of the green sheet be 20 μm or more and 30 μm or less (i.e., from 20 μm to 30 μm).

The proportion of the volume of the magnetic material relative to the sum of the volume of the magnetic material and the volume of the non-magnetic material is preferably 10% by volume or more and 80% by volume or less (i.e., from 10% by volume to 80% by volume), more preferably 15% by volume or more and 70% by volume or less (i.e., from 15% by volume to 70% by volume), and further preferably 20% by volume or more and 60% by volume or less (i.e., from 20% by volume to 60% by volume).

When the proportion of the volume of the magnetic material relative to the sum of the volume of the magnetic material and the volume of the non-magnetic material is less than 10% by volume, there is a possibility that the strength of the multilayer body may decrease.

When the proportion of the volume of the magnetic material relative to the sum of the volume of the magnetic material and the volume of the non-magnetic material is greater than 80% by volume, there is a possibility that sintering of the magnetic material and the non-magnetic material may become difficult to perform.

Conductor Pattern Formation Step

First, a laser beam is radiated onto predetermined portions of the green sheets so as to form via holes.

Next, the electrically conductive paste is applied to surfaces of the green sheets by screen printing or the like while filling the via holes with the electrically conductive paste. As a result, while conductor patterns for the via conductors are formed in the via holes, the conductor patterns for the coil conductors that are connected to the conductor patterns for the via conductors are formed on the surfaces of the green sheets. In this manner, the conductor patterns for the coil conductors and the conductor patterns for the via conductors are formed on and in the green sheets, so that the coil sheets are produced. The number of the coil sheets that are produced is two or more, and each of the coil sheets is provided with one of the conductor patterns for the coil conductors that correspond to the coil conductors illustrated in FIG. 3 and FIG. 4 and one of the conductor patterns for the via conductors that correspond to the via conductors illustrated in FIG. 3 and FIG. 4.

In addition, via sheets that are the green sheets in which the conductor patterns for the via conductors are formed by filling the via holes with the electrically conductive paste by screen printing or the like are produced separately from the coil sheets. The number of the via sheets that are produced is also two or more, and each of the via sheets is provided with one of the conductor patterns for the via conductors that correspond to the via conductors illustrated in FIG. 3 and FIG. 4.

Multilayer Body Block Production Step

The coil sheets and the via sheets are laminated together in the lamination direction in an order corresponding to that illustrated in FIG. 3 and FIG. 4 and then thermocompression-bonded, so that a multilayer body block is produced.

Multilayer Body and Coil Production Step

First, the multilayer body block is cut into pieces each having a predetermined size by using a dicer or the like so as to produce individual chips.

Next, the individual chips are fired. The temperature at which the firing is performed is, for example, 900° C. or higher and 920° C. or lower (i.e., from 900° C. to 920° C.). The length of time over which the firing is performed is, for example, 2 hours or longer and 4 hours or shorter.

By firing the individual chips, the green sheets of the coil sheets and the green sheets of the via sheets become the insulating layers. As a result, multilayer bodies in each of which the plurality of insulating layers are laminated together in the lamination direction, which is the length direction in this case, are produced. A magnetic phase and a non-magnetic phase are formed in each of the multilayer bodies.

By firing the individual chips, the conductor patterns for the coil conductors and the conductor patterns for the via conductors of the coil sheets become the coil conductors and the via conductors. As a result, a coil in which the plurality of coil conductors are laminated together in the lamination direction and electrically connected to one another by the via conductors is produced.

In the manner described above, the multilayer body and the coil formed inside the multilayer body are produced. The lamination direction of the insulating layers and the direction in which the coil axis of the coil extends are parallel to the first main surface of the multilayer body, which is the mounting surface, and in this case, they are parallel to the length direction.

By firing the individual chips, the conductor patterns for the via conductors of the via sheets become the via conductors. As a result, the first connection conductor and the second connection conductor in each of which the plurality of via conductors are laminated together in the length direction and electrically connected to one another are produced. The first connection conductor is exposed at the first end surface of the multilayer body. The second connection conductor is exposed at the second end surface of the multilayer body.

The corner portions and the ridge portions of the multilayer body may be rounded by performing, for example, barrel polishing.

Outer Electrode Formation Step

First, an electrically conductive paste that contains Ag powder and Bi-containing glass is applied to the first end surface and the second end surface of the multilayer body.

It is preferable that the proportion of the volume of the Ag powder relative to the sum of the volume of the Ag powder and the volume of the glass be 2% by volume or more and 90% by volume or less (i.e., from 2% by volume to 90% by volume).

It is preferable that the glass contained in the electrically conductive paste contain 0.001% by weight or more and 20% by weight or less (i.e., from 0.001% by weight to 20% by weight) of Bi in terms of $Bi_2O_3$, 3% by weight or more and 90% by weight or less (i.e., from 3% by weight to 90% by weight) of Si in terms of $SiO_2$, 0.001% by weight or more and 20% by weight or less (i.e., from 0.001% by weight to 20% by weight) of B in terms of $B_2O_3$, and 0.001% by weight or more and 20% by weight or less (i.e., from 0.001% by weight to 20% by weight) of K in terms of $K_2O$.

Next, the obtained coating films are baked, so that base electrodes are formed on surfaces of the multilayer body. More specifically, one of the base electrodes is formed on the multilayer body in such a manner as to extend from the first end surface to a portion of the first main surface, a portion of the first side surface, and a portion of the second side surface. The other base electrode is formed on the multilayer body in such a manner as to extend from the second end surface to a portion of the first main surface, a portion of the first side surface, and a portion of the second side surface. Here, the baking of each of the coating films is performed in an oxidizing atmosphere, such as the atmosphere, but may be performed in a reducing atmosphere.

The temperature at which each of the coating films is baked is preferably 750° C. or higher and 870° C. or lower (i.e., from 750° C. to 870° C.), more preferably 800° C. or higher and 850° C. or lower (i.e., from 800° C. to 850° C.), and further preferably 800° C. or higher and 830° C. or lower (i.e., from 800° C. to 830° C.).

The length of time over which each of the coating films is baked is preferably 10 minutes or longer and 120 minutes or shorter, more preferably 20 minutes or longer and 90 minutes or shorter, and further preferably 30 minutes or longer and 60 minutes or shorter.

After that, a nickel coating and a tin coating are sequentially formed on the surface of each of the base electrodes by performing electrolytic plating or the like.

In this manner, the first outer electrode electrically connected to the coil by the first connection conductor and the second outer electrode electrically connected to the coil by the second connection conductor are formed.

The multilayer coil component is manufactured in the manner described above.

The present specification discloses the following contents.

<1> A multilayer coil component comprising a multilayer body that includes a plurality of insulating layers laminated in a lamination direction and a coil formed inside the multilayer body; and an outer electrode that is provided at a surface of the multilayer body and electrically connected to the coil. The multilayer body has a first end surface and a second end surface that face each other in a length direction, a first main surface and a second main surface that face each other in a height direction, which is perpendicular to the length direction, and a first side surface and a second side surface that face each other in a width direction, which is perpendicular to the length direction and the height direction. The outer electrode includes a first outer electrode extending from at least a portion of the first end surface of the multilayer body to a portion of the first main surface and a second outer electrode extending from at least a portion of the second end surface of the multilayer body to a portion of the first main surface. The outer electrode includes a base electrode containing at least Ag and glass, and a diffusion length of the glass from an interface between the outer electrode and the multilayer body toward the multilayer body is 2.44 μm or more and 6.90 μm or less (i.e., from 2.44 μm to 6.90 μm).

<2> The multilayer coil component according to <1>, wherein the lamination direction in the multilayer body and a coil axis of the coil are parallel to the first main surface.

<3> The multilayer coil component according to <1> or <2>, wherein the glass contains at least Bi, and the diffusion length of the glass is a diffusion length of Bi.

<4> The multilayer coil component according to any one of <1> to <3>, wherein a size of the multilayer coil component is 0603 size, 0402 size, or 1005 size.

<5> The multilayer coil component according to any one of <1> to <4>, wherein the insulating layers include a magnetic phase containing at least Fe, Ni, Zn, and Cu and a non-magnetic phase containing at least Si.

EXAMPLES

Examples that disclose the multilayer coil component of the present disclosure in a more specific manner will be described below. Note that the present disclosure is not limited to the following examples.

Examples 1 to 6 and Comparative Examples 1 to 3

Multilayer bodies for multilayer coil components of Examples 1 to 6 and Comparative Examples 1 to 3 were manufactured by the following method.

Magnetic Material Production Step

Main components were weighed so as to achieve the following proportions: 48.0 mol % of $Fe_2O_3$, 30.0 mol % of ZnO, 14.0 mol % of NiO, and 8.0 mol % of CuO. Next, a slurry was formed by putting these weighed materials, pure water, and a dispersant into a ball mill together with PSZ media, mixing them, and then grinding them. After that, the obtained slurry was dried and then preliminarily fired at 800° C. for two hours. In this manner, a powdery ferrite material was produced as the magnetic material.

Non-Magnetic Material Production Step

Borosilicate glass powder containing Si, B, K, and Al in predetermined proportions was prepared, and forsterite powder and quartz powder were prepared as fillers. The borosilicate glass powder, the forsterite powder, and the quartz powder were weighed such that the volume ratio between borosilicate glass, forsterite, and quartz was 93:6:1. Next, a slurry was formed by putting these weighed materials, pure water, and a dispersant into a ball mill together with PSZ media, mixing them, and then grinding them. Then, the obtained slurry was dried, so that a powdery non-magnetic material was produced.

Green Sheet Production Step

The magnetic material and the non-magnetic material were weighed such that the volume ratio between the magnetic material and the non-magnetic material was 60:40. Next, a slurry was formed by putting these weighed materials, a polyvinyl butyral-based resin serving as an organic binder, and ethanol and toluene each serving as an organic solvent into a ball mill together with PSZ media, mixing them, and then grinding them. Then, the obtained slurry was formed into a sheet shape having a predetermined thickness by the doctor blade method and then punched into a predetermined shape, so that each green sheet was produced.

Conductor Pattern Formation Step

Ag powder was kneaded with predetermined amounts of a solvent (eugenol), a resin (ethyl cellulose), and a dispersant by using a planetary mixer, and then, the resulting mixture was dispersed by using a triple-roll mill, so that an electrically conductive paste was produced.

Via holes were formed in predetermined portions of the green sheets and filled with the electrically conductive paste so as to form via conductors, and after that, coil conductor patterns were printed, so that coil sheets were obtained.

In addition, via holes were formed by radiating a laser beam onto predetermined portions of the other green sheets. Via conductors were formed by filling these via holes with the electrically conductive paste, so that via sheets were obtained.

Multilayer Body Block Forming Step

The coil sheets and the via sheets were laminated together in the lamination direction in an order corresponding to that illustrated in FIG. 3 and FIG. 4 and then thermocompression-bonded, so that a multilayer body block was produced.

Multilayer Body and Coil Production Step

The multilayer body block was cut into pieces by using a dicer, so that individual chips were produced. Subsequently, the individual chips were fired at 910° C. for four hours, so that multilayer bodies were obtained. A magnetic phase and a non-magnetic phase were formed in each of the multilayer bodies.

Outer Electrode Formation Step

An electrically conductive paste for the outer electrodes, the electrically conductive paste containing Ag powder and Bi-containing glass, was poured into a coating-film forming tank so as to form a coating film having a predetermined thickness. Portions of the multilayer body at which the outer electrodes were to be formed were dipped into the coating film.

After dipping, baking was performed in the atmosphere for one hour at a temperature shown in Table 1 below, so that base electrodes of the outer electrodes were formed. The thickness of each of the base electrodes was set to about 5 μm.

In each of the base electrodes after the baking, the weight ratio between Bi in terms of $Bi_2O_3$ and Si in terms of $SiO_2$ was Bi ($Bi_2O_3$):Si ($SiO_2$)=0.0001 to 1:1.

Subsequently, a nickel coating and a tin coating were sequentially formed as plating electrodes on each of the base electrodes by electrolytic plating, so that the outer electrodes were formed.

In the manner described above, the multilayer coil components of Examples 1 to 6 and Comparative Examples 1 to 3 were manufactured.

Regarding the size of each of the produced multilayer coil components, the dimension in the length direction was 0.6 mm. The dimension in the height direction was 0.3 mm. The dimension in the width direction was 0.3 mm.

Measurement of Diffusion Length of Glass

Figure 5:
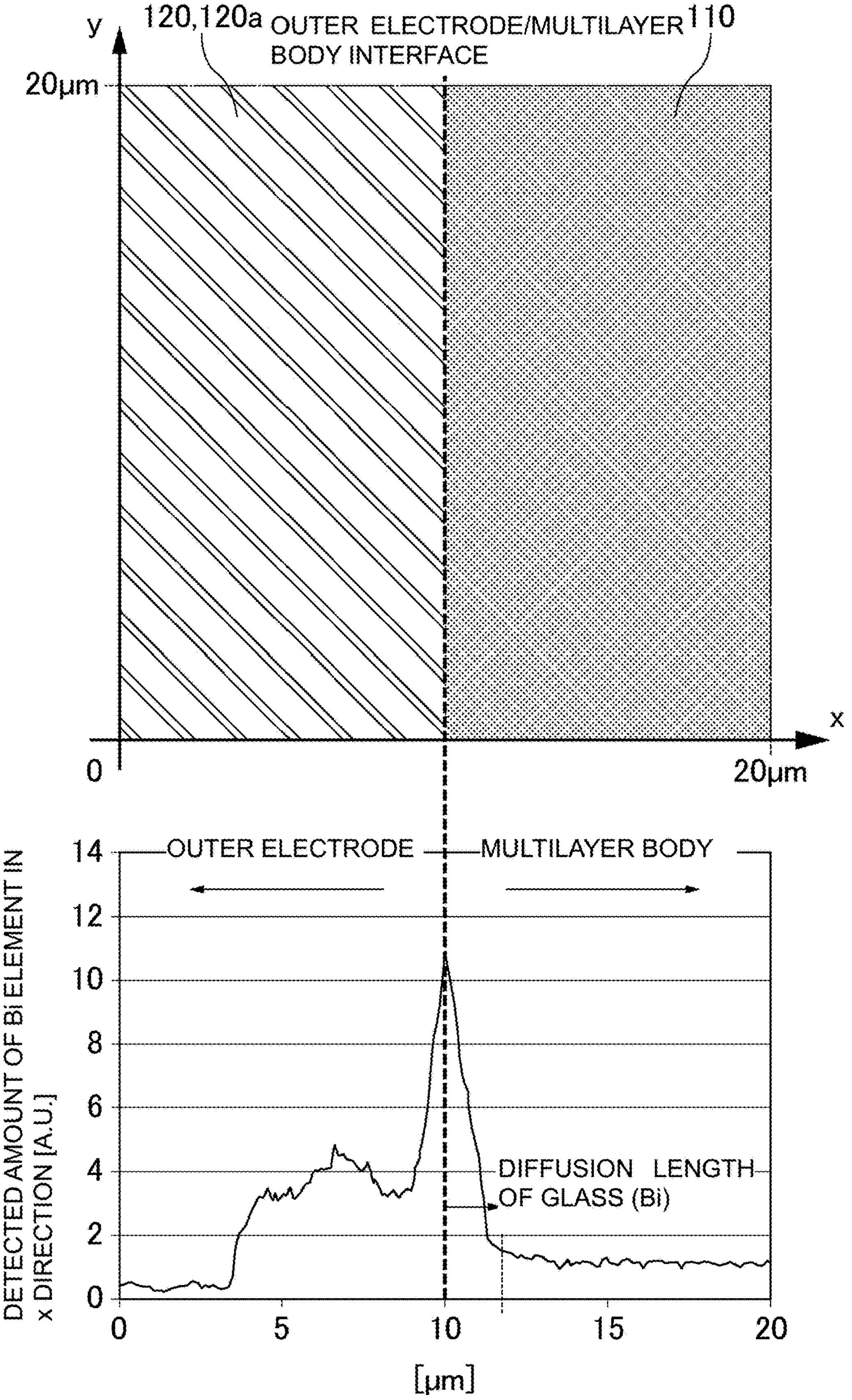
FIG. 5 is a schematic diagram illustrating a method of measuring a diffusion length of glass (Bi)

FIG. 5 is a schematic diagram illustrating a method of measuring a diffusion length of glass (Bi). Produced samples (the multilayer coil components of Examples 1 to 6 and Comparative Examples 1 to 3) were each placed upright such that the width direction thereof (the z direction) is parallel to the vertical direction and covered with a resin. Each of the samples was ground in the width direction thereof by using a grinder to a depth at which a substantially central portion of the sample in the width direction was exposed. In the obtained cross section of each of the samples, the diffusion length of glass contained in a base electrode of an outer electrode (i.e., the diffusion length of Bi, which is a component of the glass in this case) from the interface between the outer electrode and the multilayer body was measured by using the wavelength dispersive X-ray spectrometry (WDX) in the following manner. In other words, as illustrated in FIG. 5, line analysis of Bi element was performed on a square region of a 20 μm section from a position of about 0 μm on an outer electrode 120 (a base electrode 120*a*) side to a position of about 20 μm on a multilayer body 110 side across the interface (the position of 10 μm) between the outer electrode 120 and the multilayer body 110 in the x direction and a 20 μm section from the bottom surface of the multilayer body 110 to a position about 20 μm in the y direction. Specifically, the above-described square region was divided into 256×256 unit square regions, and the detected amount of the Bi element was measured for each unit square. Then, the average value of the detected amounts of the Bi element for 256 unit squares in the y direction at every other unit square in the x direction is obtained, and the average value is defined as the detected amount of the Bi element in the x direction. Note that the measurement region in the y direction is limited to an area in which the interface between the outer electrode and the multilayer body is present. The areas in the y direction where the interface is not present are excluded from the measurement results. Then, the distance from the interface to a position where the X-ray intensity became flat (background) was defined as the diffusion length of glass (Bi). Here, a moving average value of the detected amounts of the Bi element at five points in the x direction is calculated, and a point at which the difference from a point immediately before the point is 3% or less for the first time in three consecutive points in the positive x-axis direction (the direction from the outer electrode toward the multilayer body) is taken as the background. The results are shown in Table 1 below.

Note that the position of the interface can be determined from an observation image of a chip cross section. In most cases, the position of the interface naturally has a range (varies) also in the x direction, and in this case, the average of the x coordinate values of the interface determined at the y coordinate values may be obtained. For example, it is preferable to divide the image of the chip cross section into unit square regions (regions obtained by dividing a square region of 20 μm×20 μm into 256×256 regions) the same as those in the above-mentioned detection of the Bi element using the WDX, perform image analysis thereon, and calculate the average of the x coordinate values of the interface determined at the y coordinate values.

In this measurement, the position of the interface and the peak position of the X-ray intensity coincided with each other, and thus, the position at which the X-ray intensity reached its peak was defined as the position of the interface between the base electrode and the multilayer body for convenience of description.

Measurement of Bonding Strength of Outer Electrode 15 produced samples of each of the multilayer coil component of Examples 1 to 6 and Comparative Examples 1 to 3 were prepared. Each of the samples was mounted on a glass epoxy substrate, and fixing strength measurement was performed by using a bond tester, which is a bonding strength tester. The results were Weibull-plotted, and the fixing strength at which the failure probability was 1% was determined. In addition, evaluation of a failure mode was performed on the 15 evaluated samples so as to determine which mode was dominant. The failure modes were classified into failure between the multilayer body and the base electrode (Ag), failure between the base electrode (Ag) and a plating electrode, failure in the multilayer body around the outer electrode, and failure in a fillet. The results are shown in Table 1 below.

TABLE 1

| | Baking Temperature of Base Electrode (° C.) | Diffusion Length (μm) of Glass (Bi) | Fixing Strength (N) at which Failure Probability is 1% | Main Failure Mode |
|---|---|---|---|---|
| Comparative Example 1 | 719 | 1.80 | 2.63 | Failure between Multilayer Body and Base Electrode (Ag) |
| Comparative Example 2 | 744 | 2.40 | 2.82 | Failure between Multilayer Body and Base Electrode (Ag) |
| Example 1 | 769 | 2.52 | 3.78 | Failure in Multilayer Body around Outer Electrode |
| Example 2 | 789 | 2.53 | 3.95 | Failure in Multilayer Body around |

TABLE 1-continued

| | Baking Temperature of Base Electrode (° C.) | Diffusion Length (μm) of Glass (Bi) | Fixing Strength (N) at which Failure Probability is 1% | Main Failure Mode |
|---|---|---|---|---|
| Example 3 | 809 | 2.60 | 5.24 | Outer Electrode, Failure in Fillet Failure in Multilayer Body around Outer Electrode, |
| Example 4 | 829 | 3.12 | 5.46 | Failure in Fillet Failure in Multilayer Body around Outer Electrode, |
| Example 5 | 849 | 5.16 | 4.43 | Failure in Fillet Failure in Multilayer Body around Outer Electrode, |
| Example 6 | 869 | 6.72 | 3.09 | Failure in Fillet Failure in Multilayer Body around Outer Electrode |
| Comparative Example 3 | 879 | 7.30 | 2.70 | Failure in Multilayer Body around Outer Electrode |

Figure 6:
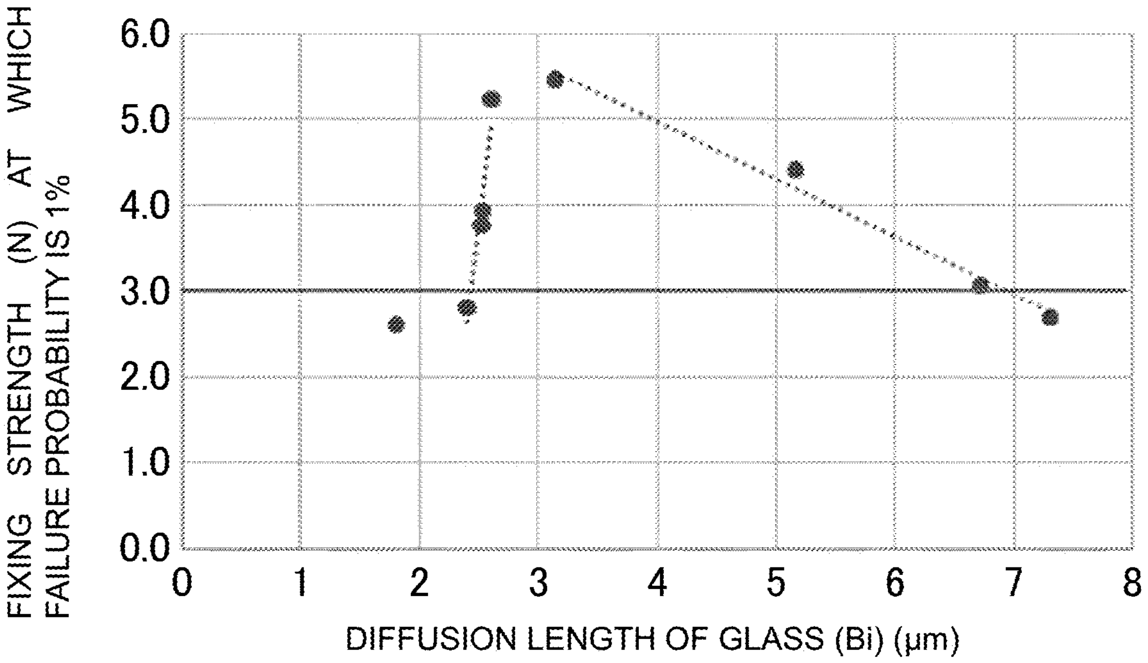
FIG. 6 is a scatter diagram in which diffusion lengths of glass (Bi) and fixing strengths at which a failure probability is 1% in multilayer coil components of Examples 1 to 6 and Comparative Examples 1 to 3 are plotted.

FIG. 6 is a scatter diagram in which diffusion lengths of glass (Bi) and fixing strengths at which a failure probability is 1% in multilayer coil components of Examples 1 to 6 and Comparative Examples 1 to 3 are plotted. FIG. 6 illustrates an approximate line passing through four points of Comparative Example 2 and Examples 1 to 3 and an approximate line passing through four points of Examples 4 to 6 and Comparative Example 3. It is understood from these approximate lines that the fixing strength at which the failure probability is 1% is 3 N or more when the diffusion length of glass (Bi) is 2.44 μm or more and 6.90 μm or less (i.e., from 2.44 μm to 6.90 μm).

As shown in Table 1 and as illustrated in FIG. 6, in Examples 1 to 6 in which the diffusion length of Bi, that is, glass, is 2.44 μm or more and 6.90 μm or less (i.e., from 2.44 μm to 6.90 μm), the fixing strength at which the failure probability is 1% can be 3 N or more. In addition, regarding the failure mode, the main failure is failure in the multilayer body around the outer electrode or failure in the fillet, and it is assumed that a sufficient fixing strength is obtained.

Note that, in each of Examples 1 to 6 and Comparative Examples 1 to 3, the diffusion length of glass (Bi) is the average value of the 15 samples.

Although when the fixing strength at which the failure probability is 1% is greater than 2 N in a multilayer coil component, the multilayer coil component is usually regarded as a multilayer coil component capable of withstanding an installation environment in the market, here, a margin of fixing strength was introduced, and the bonding strength was evaluated using a reference value of 3N, which is 1.5 times higher than 2N.

What is claimed is:

1. A multilayer coil component comprising:

a multilayer body that includes a plurality of insulating layers laminated in a lamination direction and a coil inside the multilayer body; and an outer electrode that is at a surface of the multilayer body and electrically connected to the coil, wherein the multilayer body has a first end surface and a second end surface that face each other in a length direction, a first main surface and a second main surface that face each other in a height direction, which is perpendicular to the length direction, and a first side surface and a second side surface that face each other in a width direction, which is perpendicular to the length direction and the height direction, the outer electrode includes a first outer electrode extending from at least a portion of the first end surface of the multilayer body to a portion of the first main surface and a second outer electrode extending from at least a portion of the second end surface of the multilayer body to a portion of the first main surface, the outer electrode includes a base electrode including at least Ag and glass, and a diffusion length of the glass from an interface between the outer electrode and the multilayer body toward the multilayer body is from 2.44 μm to 6.90 μm.

2. The multilayer coil component according to claim 1, wherein the lamination direction in the multilayer body and a coil axis of the coil are parallel to the first main surface.

3. The multilayer coil component according to claim 2, wherein the glass includes at least Bi, and the diffusion length of the glass is a diffusion length of Bi.

4. The multilayer coil component according to claim 2, wherein a size of the multilayer coil component is 0603 size, 0402 size, or 1005 size.

5. The multilayer coil component according to claim 2, wherein the insulating layers include a magnetic phase including at least Fe, Ni, Zn, and Cu and a non-magnetic phase including at least Si.

6. The multilayer coil component according to claim 1, wherein the glass includes at least Bi, and the diffusion length of the glass is a diffusion length of Bi.

7. The multilayer coil component according to claim 1, wherein a size of the multilayer coil component is 0603 size, 0402 size, or 1005 size.

8. The multilayer coil component according to claim 1, wherein the insulating layers include a magnetic phase including at least Fe, Ni, Zn, and Cu and a non-magnetic phase including at least Si.

* * * * *